United States Patent
Lim et al.

(10) Patent No.: US 9,875,854 B2
(45) Date of Patent: Jan. 23, 2018

(54) FLEXIBLE SUPERCAPACITOR AND METHOD OF FABRICATING THE SAME

(71) Applicant: UNIVERSITI PUTRA MALAYSIA, Serdang (MY)

(72) Inventors: Hong Ngee Lim, Serdang (MY); Wei Kit Chee, Serdang (MY); Chi Huey Ng, Serdang (MY); Nay Ming Huang, Kuala Lumpur (MY)

(73) Assignee: Universiti Putra Malaysia, Serdang (MY)

( * ) Notice: Subject to any disclaimer, the term of this patent is extended or adjusted under 35 U.S.C. 154(b) by 75 days.

(21) Appl. No.: 15/034,858

(22) PCT Filed: Mar. 27, 2015

(86) PCT No.: PCT/MY2015/000020
§ 371 (c)(1),
(2) Date: May 5, 2016

(87) PCT Pub. No.: WO2016/053079
PCT Pub. Date: Apr. 7, 2016

(65) Prior Publication Data
US 2016/0284480 A1    Sep. 29, 2016

(30) Foreign Application Priority Data
Sep. 29, 2014    (MY) .................. PI 2014702839

(51) Int. Cl.
*H01G 11/36* (2013.01)
*H01G 11/02* (2013.01)
(Continued)

(52) U.S. Cl.
CPC .......... *H01G 11/36* (2013.01); *H01G 11/02* (2013.01); *H01G 11/38* (2013.01); *H01G 11/46* (2013.01);
(Continued)

(58) Field of Classification Search
None
See application file for complete search history.

(56) References Cited

U.S. PATENT DOCUMENTS

| 2012/0026643 | A1 | 2/2012 | Yu et al. |
| 2013/0236785 | A1* | 9/2013 | Zhou ............... H01G 11/36 429/217 |

(Continued)

FOREIGN PATENT DOCUMENTS

| JP | 2013151398 A | 8/2013 |
| JP | 2014116146 A | 6/2014 |
| WO | 2010/027337 A1 | 3/2010 |

OTHER PUBLICATIONS

International Search Report and Written Opinion of International Application No. PCT/MY2015/000020.

*Primary Examiner* — Dion R Ferguson
(74) *Attorney, Agent, or Firm* — Joseph G. Chu; JCIP

(57) ABSTRACT

A flexible supercapacitor comprising an electrolyte sandwiched between nickel foams electrodeposited with a nanocomposite. The nanocomposite comprises of a conducting polymer, graphene oxide and a metal oxide. Process of fabricating the flexible supercapacitor is also provided. The process comprises electrodepositing a nanocomposite electro-potentiostatically on a nickel foam from an aqueous solution comprising of a conducting monomer, graphene oxide and a metal salt, placed in one compartment cell followed by compressing an electrolyte between at least two layers of electrodeposited nickel foams.

19 Claims, 16 Drawing Sheets

(51) Int. Cl.
  *H01G 11/46*  (2013.01)
  *H01G 11/48*  (2013.01)
  *H01G 11/86*  (2013.01)
  *H01G 11/56*  (2013.01)
  *H01G 11/38*  (2013.01)
  *H01G 11/70*  (2013.01)

(52) U.S. Cl.
  CPC ............. *H01G 11/48* (2013.01); *H01G 11/56* (2013.01); *H01G 11/70* (2013.01); *H01G 11/86* (2013.01); *Y02E 60/13* (2013.01)

(56) References Cited

U.S. PATENT DOCUMENTS

| | | | |
|---|---|---|---|
| 2014/0087192 A1 | 3/2014 | Lai et al. | |
| 2015/0287544 A1* | 10/2015 | Irazoqui | H01G 11/36 361/502 |
| 2015/0340171 A1* | 11/2015 | Li | H01G 11/32 252/508 |
| 2016/0189882 A1* | 6/2016 | Xie | H01G 11/32 361/502 |

* cited by examiner

FLEXIBLE SUPERCAPACITOR AND METHOD OF FABRICATING THE SAME

TECHNICAL FIELD

Embodiments of the present invention generally relate to a supercapacitor, and more particularly, to a flexible supercapacitor having a layer of an electrolyte between layers of nickel foams electrodeposited with a nanocomposite.

BACKGROUND ART

Enormous demands for energy storage devices have resulted in development of supercapacitor, especially for applications in electronic devices and hybrid vehicles. Carbon-based materials such as activated carbon and carbon nanotubes have been widely applied to Electrical Double Layer Capacitance (EDLC) supercapacitors.

Pseudocapacitors are also one of the existing types of supercapacitors. The pseudocapacitors have electrodes made up of metal oxide/hydroxides and conducting polymers and employ oxidation/reduction (redox) mechanism, which occurs within the electrode materials.

Recent developments in the domain of supercapacitors disclose use of graphene as a carbon material for use in fabrication of supercapacitors. The properties of graphene such as theoretically large surface area, excellent conductivity, good capacitance behavior, and low production cost make it a promising carbon material for supercapacitors. It has been evident by experimental exercises that graphene exhibits a very high electron mobility and a low resistivity, which are ideal for electrochemical storage devices.

Further, polypyrrole (PPy) is an attractive supercapacitor because of its excellent electrical and capacitance properties, good environmental stability, and ease of preparation. Further, PPy has an additional advantage of being used in flexible supercapacitors by virtue of its effective mechanical flexibility. The metal oxides $MnO_2$, $RuO_2$, and CoO have also been widely used as supercapacitor materials. In addition to aforesaid metal oxides, zinc oxide (ZnO) possesses a high energy density and is therefore highly suitable for supercapacitor applications. Further, it is also discovered that a ZnO/graphene nanocomposite exhibits excellent long-term charge/discharge recycling ability with a high capacitive performance.

US2013/0155579A1 titled "Flexible conducting polymer energy storage device" by Massachusetts Institute of Technology describes an electrochemical redox supercapacitor which consists of two thin films of electrically conducting polymer separated by an ion-permeable membrane and an electrolyte disposed between the two thin films. Further, a multi-step method is disclosed for manufacturing the redox supercapacitor.

US 2014/0087192A1 titled "Conducting polymer/graphene-based material composites, and methods for preparing the composites" by Agency for Science, Technology & Research and Nanyang Technological University discloses a composite comprising a conducting polymer and a graphene-based material is provided. The composite includes a graphene-based material doped with nitrogen or having a nitrogen-containing species grafted thereon, and a conducting polymer arranged on the graphene-based material. Further, the aforesaid document discloses a two-step method comprising doping graphene oxide with nitrogen followed by polymerization of monomers of the conducting polymer on the graphene-based materials in the presence of an oxidant to form the composite.

One of the major problems in existing supercapacitors is the weak cycling stability upon continual charge/discharge. Electrostatic storage mechanism of an EDLC-based electrode stores only limited charges. Further, the fabrication process of such supercapacitors is very complex and comprises of multiple steps.

Accordingly, there remains a need in the prior arts to have a flexible supercapacitor which overcomes the aforesaid problems and shortcomings.

However, there remains a need in the art for a flexible capacitor having excellent electrochemical, good mechanical strength, light weight, remarkable flexibility and simple fabrication process. Further, it should have the capability to withstand stress at various curvatures.

DISCLOSURE OF THE INVENTION

Embodiments of the present invention aim to provide a flexible supercapacitor and process of fabricating the same. The flexible supercapacitor exhibits a remarkable electrochemical stability when subjected to bending at various angles. The cycling stability of the supercapacitor shows favorable specific capacitance retention of more than 90% after 1000 cycles for mild alkaline electrolytes compared to strong alkalic electrolytes. Hence, the energy storage capability is improved. Further, the flexible supercapacitor can be fabricated in a single step of synthesis of an electrode material onto a conductive substrate. The flexible supercapacitor is provided with the features of claim 1, however the invention may additionally reside in any combination of features of claim 1.

In accordance with an embodiment of the present invention, the flexible supercapacitor comprising an electrolyte sandwiched between nickel foams electrodeposited with a nanocomposite. The nanocomposite comprises of a conducting polymer, graphene oxide and a metal oxide.

In accordance with an embodiment of the present invention, the conducting polymer is selected from a group consisting of, but not limited to, polypyrrole, polyaniline, polythiophene, polystyrene sulfonate.

In accordance with an embodiment of the present invention, the metal oxide is selected from a group consisting of, but not limited to, zinc oxide, manganese oxide, cobalt oxide, copper oxide, nickel oxide, iron oxide; mixed oxides such as nickel cobaltite and zinc ferrite.

In accordance with an embodiment of the present invention, the nanocomposite is doped with dopants selected from a group consisting of, but not limited to, sodium toluenesulfonate, sulfuric acid, ammonium persulfate, meta-chloroperoxybenzoic acid, hydrochloric acid, phosphoric acid and iron chloride.

In accordance with an embodiment of the present invention, the electrolyte is selected from a group consisting of, but not limited to, polyvinylacetate/KOH hydrogel polymers based on polymers selected from a group consisting of polyvinylacetate, polypropylene oxide and polyethylene oxide.

Embodiments of the present invention aim further to provide a process for preparation of the flexible supercapacitor by performing the steps as mentioned in claim 6. The invention may additionally be performed by performing the steps of claim 6 in any appropriate order.

In accordance with an embodiment of the present invention, the process for preparation of the flexible supercapacitor comprising electrodepositing a nanocomposite electropotentiostatically on a nickel foam from an aqueous solution and compressing an electrolyte between at least two layers of electrodeposited nickel foams. The aqueous solution comprises of conducting monomer, graphene oxide and metal sulphate.

In accordance with an embodiment of the present invention, the electrodepositing is carried out at a constant potential selected from 0.2 V to 2.0V, at 20° C. to 40° C. for 1 to 180 minutes. Preferably, the electrodepositing is carried out at a constant potential of +0.8 V (versus SCE) at 30° C. for 15 minutes.

In accordance with an embodiment of the present invention, the aqueous solution comprises 0.1 µM to 10 M of the conducting monomer, 0.1 µM to 10 M of metal salt and 0.1 µM to 10 M the graphene oxide.

In accordance with an embodiment of the present invention, the compartment cell comprises of nickel foam as a working electrode and platinum rod as a counter electrode and saturated calomel electrode (SCE) as a reference electrode.

In accordance with an embodiment of the present invention, the conducting monomer is polymerized to form its corresponding conducting polymer.

In accordance with an embodiment of the present invention, the conducting polymer is selected from a group consisting of, but not limited to, polypyrrole, polyaniline, polythiophene, polystyrene sulfonate.

In accordance with an embodiment of the present invention, the aqueous solution comprises of a dopant selected from a group comprising of, but not limited to, sodium toluenesulfonate, sulfuric acid, ammonium persulfate, metachloroperoxybenzoic acid, hydrochloric acid, phosphoric acid and iron chloride.

In accordance with an embodiment of the present invention, the metal salt converts into a corresponding metal oxide during said electrodeposition. Preferably, the metal salt is selected from metal complexes such as chlorides, acetates and sulphates.

While the present invention is described herein by way of example using several embodiments and illustrative drawings, those skilled in the art will recognize that the invention is neither intended to be limited to the embodiments of drawing or drawings described, nor intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention covers all modification/s, equivalents and alternatives falling within the spirit and scope of the present invention as defined by the appended claims. The Headings are used for organizational purposes only and are not meant to limit the scope of the description or the claims. As used throughout this description, the word "may" is used in a permissive sense (i.e. meaning having the potential to), rather than the mandatory sense (i.e. meaning must). Further, the words "a" or "an" mean "at least one" and the word "plurality" means one or more, unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and any additional subject matter not recited, and is not intended to exclude any other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention.

In this disclosure, whenever a composition or an element or a group of elements is preceded with the transitional phrase "comprising", it is understood that we also contemplate the same composition, element or group of elements with transitional phrases "consisting essentially of, "consisting", "selected from the group consisting of", "including", or "is" preceding the recitation of the composition, element or group of elements and vice versa.

DESCRIPTION OF DRAWINGS AND BEST MODE FOR CARRYING OUT THE INVENTION

So that the manner in which the above recited features of the present invention can be understood in detail, a more particular description of the invention, briefly summarized above, may be had by reference to embodiments, some of which are illustrated in the appended drawings. It is to be noted, however, that the appended drawings only illustrate typical embodiments of this invention and are therefore not to be considered limiting its scope, for the invention may extend to other equally effective embodiments.

These and other features, benefits and advantages of the present invention will become apparent by reference to the following text figures, with like reference numbers referring to like structures across the views, wherein:

FIG. 4 (*b*) is a pictorial representation of Field Emission Scanning Electron Microscope (FESEM) images of PPy.

FIG. 4 (*c*) is a pictorial representation of Field Emission Scanning Electron Microscope (FESEM) images of PPy/GO.

FIG. 4 (*d*) is a pictorial representation of Field Emission Scanning Electron Microscope (FESEM) images of PPy/GO.

FIG. 4 (*e*) is a pictorial representation of Field Emission Scanning Electron Microscope (FESEM) images of PPy/GO/ZnO.

FIG. 4 (*f*) is a pictorial representation of Field Emission Scanning Electron Microscope (FESEM) images of PPy/GO/ZnO.

FIG. 4(*g*) is a pictorial representation of elemental mapping of PPy/GO/ZnO based on FESEM image as shown in FIG. 4 (*e*).

FIG. 6(*b*) is a pictorial representation of the flexible supercapacitor bent at angle 45°.

FIG. 6(*c*) is a pictorial representation of the flexible supercapacitor bent at angle 90°.

FIG. 6(*d*) is a pictorial representation of the flexible supercapacitor bent at angle 135°.

Figure 1:
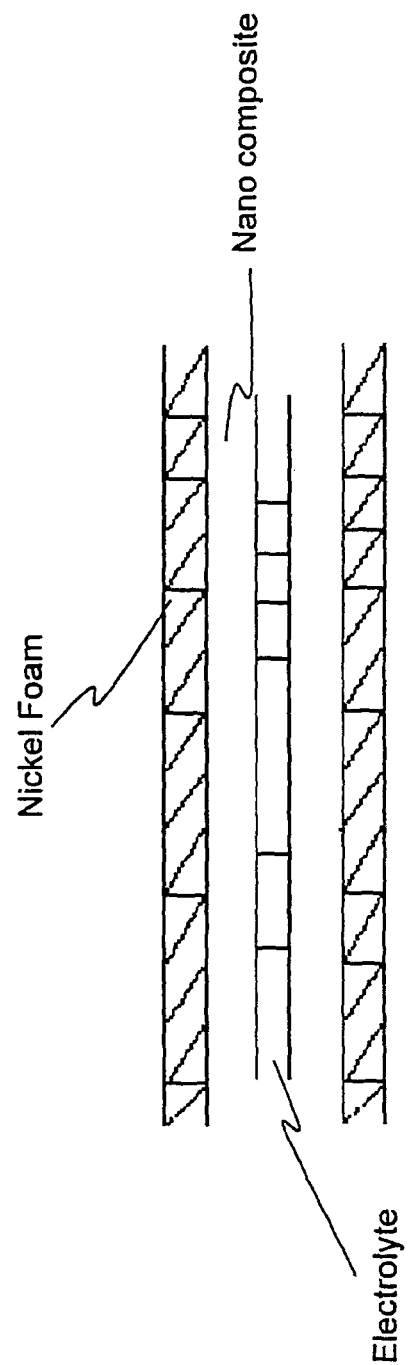
FIG. 1 is a schematic diagram of a flexible supercapacitor in accordance with an embodiment of the present invention.

The present invention is described hereinafter by various embodiments with reference to the accompanying drawings. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as being suitable for various facets of the implementations. These materials are to be treated as exemplary, and are not intended to limit the scope of the invention.

Embodiments of the present invention aim to provide a flexible supercapacitor and process of fabricating the same. The flexible supercapacitor exhibits a remarkable electrochemical stability when subjected to bending at various angles. The cycling stability of the supercapacitor shows favorable specific capacitance retention of more than 90% after 1000 cycles for mild alkaline electrolytes compared to strong alkalic electrolytes. Hence, the energy storage capability is improved. Further, the flexible supercapacitor can be fabricated in a single step by synthesis of an electrode material onto a conductive substrate.

Referring to the drawings, the invention will now be described in more detail.

In accordance with an embodiment of the present invention, a free-standing polypyrrole (PPy)/graphene oxide (GO)/zinc oxide (ZnO) based supercapacitor is provided. The supercapacitor is fabricated using a simple and rapid single-step electrochemical deposition process under normal conditions.

FIG. 1 shows a schematic diagram of a flexible supercapacitor in accordance with an embodiment of the present invention. The flexible supercapacitor is fabricated by sandwiching a polyvinyl alcohol hydrogel polymer electrolyte between two layers of a nanocomposite electrodeposited nickel foams. The electrochemical properties of the free-standing supercapacitor were analyzed using a two-electrode system.

For disclosing best mode for carrying out the invention, the nanocomposite is selected to comprise of PPy, GO and ZnO. The flexible supercapacitor achieved a specific capacitance of 123.8 F/g at 1 A/g, which was greater than its single (39.1 F/g) and binary (81.3 F/g) counterparts. This suggests that ZnO acts as a spacer and support that hinders the ternary structure from collapsing and subsequently enhances the diffusion of ions within the matrix. The flexible supercapacitor exhibited a remarkable electrochemical stability when subjected to bending at various angles. The cycling stability of the ternary nanocomposite showed favorable specific capacitance retention of more than 90% after 1000 cycles for mild alkaline electrolytes compared to strong alkalic electrolytes. The presence of glycerin in the polymer electrolyte enabled the flexible supercapacitor to perform better under the vigorous cycling condition. The potential of the as-fabricated flexible supercapacitor for real applications was manifested by its ability to light up a light emitting diode after being charged.

It has been shown by way of examples that PPy/GO electrode recorded the lowest equivalent series resistance (ESR) as a result of the graphene network structure facilitating efficient excess electrolyte ions within the graphene surface, thus shortening the ion diffusion pathway. The presence of ZnO in the nanocomposite caused the flexible supercapacitor to exhibit the highest ESR, implying that the electrode material is more resistive.

The ternary nanocomposite exhibited a specific capacitance of 123.8 F/g at 1 A/g and a typical pseudo rectangular Cyclic Voltammetry (CV) shape at a two-electrode configuration, indicating excellent capacitive performance with an ideal charging/discharging behavior.

Even after charging/discharging for 1000 cycles, the capacitance dropped drastically for a strong alkali electrolyte, whereas 92.7% of the capacitance was retained for a 1 M $CH_3COONa$ electrolyte.

EXPERIMENTS

Preparation of Qraphene Oxide (GO)

GO was prepared via the modified Hummer's method, where 3 g of graphite flakes was oxidized by the addition of $H_2SO_4$:$H_3PO_4$ (360:40 ml) and 18 g of $KMnO_4$. The mixture was stirred for approximately 5 minutes in order to complete the oxidation process. $H_2O_2$ solution was added to stop the oxidation reaction, at which time the color of the mixture changed from dark brown to bright yellow. The mixture was then washed with a 1 M HCl solution, following by deionized water repeatedly until a constant pH of 4-5 was obtained. The washing process was conducted via a centrifugation technique. As a result of the washing, the graphite oxide experienced exfoliation and ultimately formed a GO gel. The concentration of GO used was 5.50 mg/ml.

Preparation of PPy/GO/ZnO Nanocomposite on Nickel Foam

A PPy/GO/ZnO nanocomposite was electro-potentiostatically deposited on the nickel foam from an aqueous solution placed in one compartment cell. The aqueous solution contained 0.1 M of pyrrole, 1 mg/ml concentration of GO, 0.1 M of $ZnSO_4$, and 0.1 M of Sodium ptolunenesulphonate (NapTS). An AUTOLAB (Metrohm PGSTAT204) potentiostat-galvanostat was used for the synthesis, in which the working electrode was the nickel foam, a platinum rod was the counter electrode, and a saturated calomel electrode (SCE) was used as the reference electrode. The electrochemical deposition was carried out at a constant potential of +0.8 V (versus SCE) at room temperature for 15 minutes.

For the activated carbon (AC) electrode, a slurry of activated carbon was prepared by mixing the powder with deionized water. The nickel foam was soaked in the powder paste and left for approximately 30 minutes. The prepared nickel foam/AC electrode was fully dried under ambient conditions before proceeding to the electrochemical measurement.

Preparation of PVA/KOH Hydrogel Polymer Electrolyte

One gram of PVA flakes was mixed with 10 ml of water. The mixture was heated and stirred until a clear solution was obtained. Upon cooling to ambient temperature, 1.68 g of KOH pellets was added, and the solution was stirred thoroughly. 10% of glycerol was added as a plasticizer to prevent the loss of the electrolyte due to evaporation. The prepared gel solution was poured onto a glass dish and left under ambient conditions to allow the evaporation of excess water.

Comparison Examples:

PPy and a PPy/GO composite were also prepared using the same method used to prepare nanocomposite, for comparison purposes.

A PVA/CH$_3$OONa.hydrogel polymer electrolyte was also prepared using the same method used for preparing PVA/KOH hydrogel polymer.

Preparation of Two-Electrode Cell

The as-prepared PPy/GO/ZnO nanocomposite on the nickel foam was used as an electrode for the fabrication of a supercapacitor. A two-electrode configuration supercapacitor was arranged as shown in FIG. 1. The electrodes were assembled in parallel, with a PVA/KOH hydrogel between them. The sample was subjected to compression at 50 kPa to ensure maximum contact between the electrode surface and separator. The hydrogel acted as both an electrolyte reservoir and porous ion separator. Supercapacitors with the PVA/CH$_3$COONa hydrogel and AC were also prepared via the same method.

Electrochemical Study

The electrochemical properties of the prepared nanocomposite were evaluated using the same potentiostat/galvanostat system. Cyclic Voltammetry (CV), galvanostatic charge/discharge measurements, and electrochemical impedance spectroscopy (EIS) were carried out using the fabricated free standing supercapacitor as a two-electrode cell. CV was performed at a working potential of −0.2 V to 0.7 V with scan rates between 5 mV/s and 100 mV/s. The galvanostatic charge/discharge of the two-electrode system was carried out from 0 V to 0.9 V, and the specific capacitance (Cm) was calculated from the discharge curve using Equation (1).

$$Cm = i/(-dV/dt) \qquad \text{Equation (1)}$$

where
i=applied current;
dV/dt=slope of the discharge curve (V/s).
EIS was performed between 5 mHz and 100 KHz, with an AC amplitude of 5 mV.

Material Characterization

The crystallinity of each sample was evaluated using a Siemens D5000 X-ray diffraction analyzer (XRD). The surface morphology of a synthesized nanocomposite was analyzed using a field emission scanning electron microscope, FESEM (FEI Quanta 400F), equipped with the EDX feature. Raman spectra were recorded using Renashaw's inVia Raman microscope with a 532-nm laser.

Results

Figure 2:
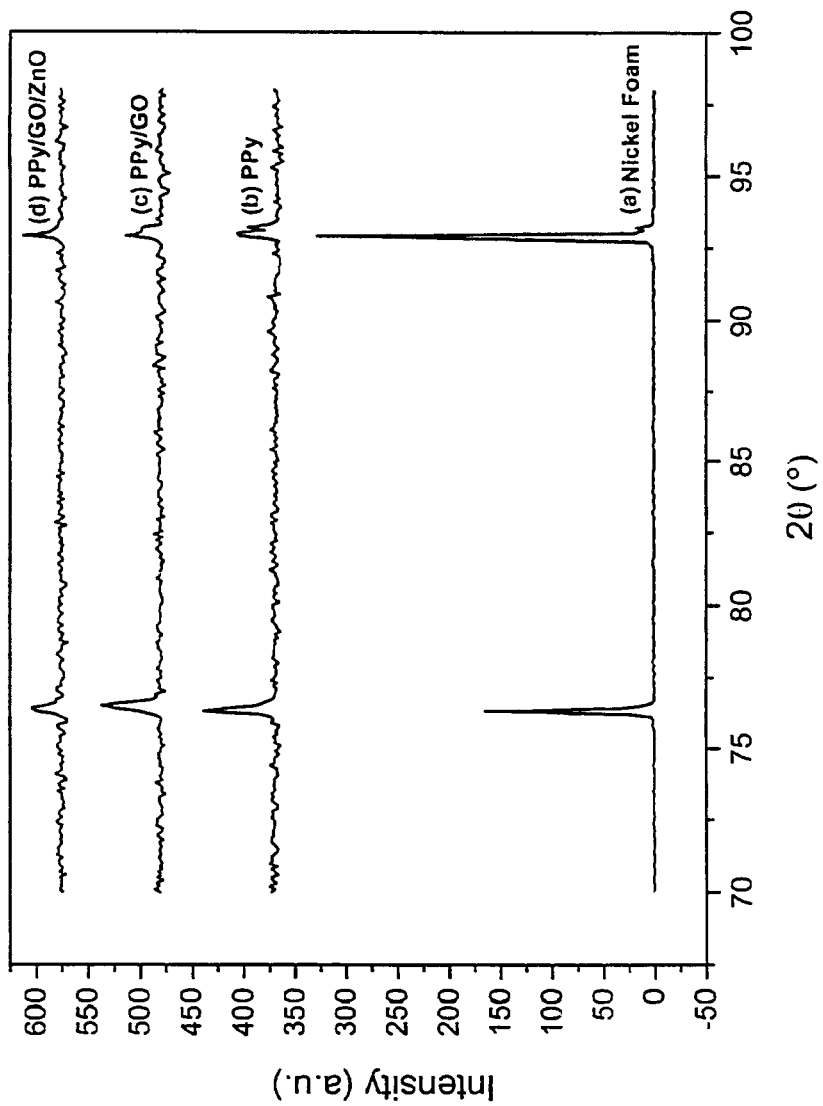
FIG. 2 is a graph depicting X-ray Diffraction Analyzer (XRD) diffraction peaks of (a) nickel foam, (b) polypyrrole (PPy), (c) PPy/Graphene (GO), and (d) PPy/GO/Zinc Oxide (ZnO).

The XRD patterns of the PPy/GO and PPy/GO/ZnO nanocomposites were not distinguishable from that of PPy (FIG. 2). This indicates that no additional crystalline phase was introduced into the nanocomposite. The XRD pattern of the bare nickel foam shows typical peaks corresponding to the (220) and (311) cystallographic planes of nickel. The high intensity peak at 92.9° (311) for the nickel foam decreased tremendously for all the electrodeposited nickel foam, suggesting the adhesion of materials enveloping the structure. Moreover, the characteristic peaks of the nickel decreased to the lowest values upon the introduction of ZnO, indicating that the sample was well and evenly deposited across the network structure of the nickel foam.

Figure 3:
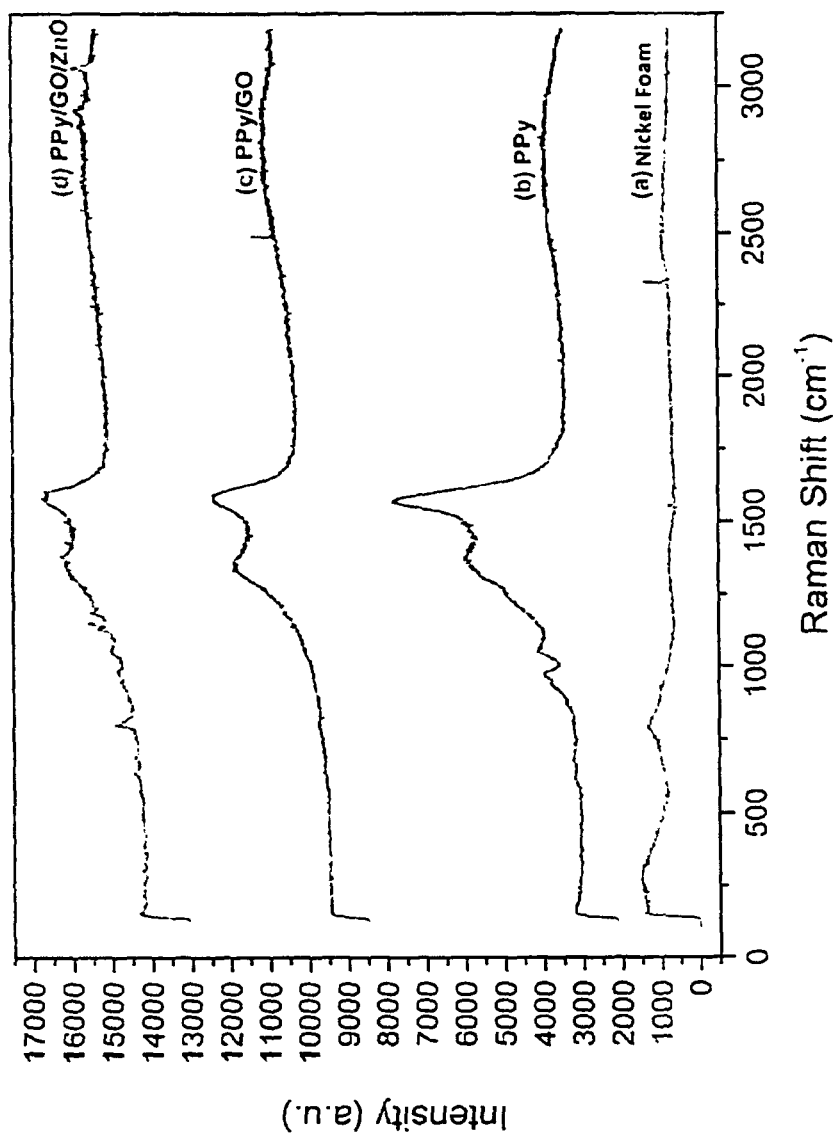
FIG. 3 is a graph depicting Raman spectra of (a) blank nickel foam, (b) PPy, (c) PPy/GO, and (d) PPy/GO/ZnO.

Not unlike the XRD profiles, the Raman spectra show that the nickel foam was successfully blanketed with the electrodeposited materials (FIG. 3). The Raman spectrum of PPy shows characteristic bands at 1377.77 cm$^{-1}$ and 1574.95 cm$^{-1}$, which indicate ring stretching and C=C backbone stretching for PPy, respectively. The two small peaks at 963.65 cm$^{-1}$ and 1051.14 cm$^{-1}$ are assigned to the polaron symmetric C—H in-plane bending vibration. For the PPy/GO nanocomposite, the inclusion of GO at a low concentration of 1 mg/ml barely altered the characteristic bands of PPy at 1359.34 cm$^{-1}$ and 1569.42 cm$^{-1}$, even though the latter peak is visibly lower in intensity. In addition to having the two pronounced peaks like PPy and PPy/GO, a new peak emerges at 1149.68 cm$^{-1}$ for the PPy/GO/ZnO spectrum, which corresponds to the LO phonon of the Al mode of ZnO.

Figure 4C:
FIG. 4(*a*) is a pictorial representation of Field Emission Scanning Electron Microscope (FESEM) images of PPy.
Figure 4F:
Figure 4B:
Figure 4E:
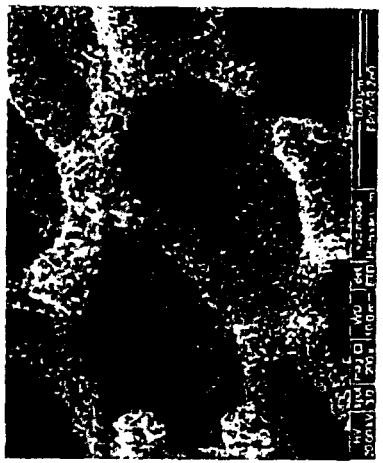
Figure 4A:
Figure 4D:
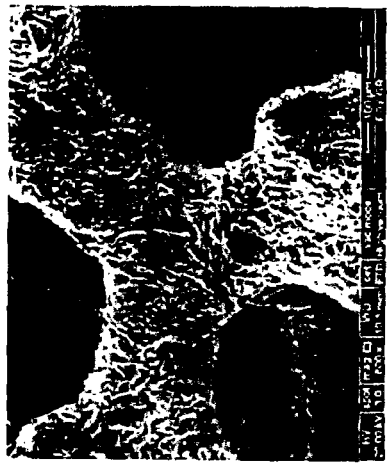

As shown in FIG. 4(a), during the electrodeposition of PPy on the nickel foam network, the micron-sized pores of the foam were filled with the conducting polymer. FIG. 4(b) shows that at a higher magnification, these pores are seen to be covered by a uniform layer of PPy at a thickness of approximately 50 μm. A fibril-like scaffold continues to grow from the PPy to the core of a pore. This could be due to the lack of support for the growth of PPy to enable full coverage of the pore, which results in a structure with a limited degree of porosity. In contrast, the presence of GO is able to control the deposition of the PPy/GO on the nickel foam, leading to a structure with a high amount of voids, as can be seen in FIG. 4(c). Upon scrutiny, homogeneous sheets in lateral positions cover the entire surface of the framework which can be seen in FIG. 4(d).

Figure 4G:
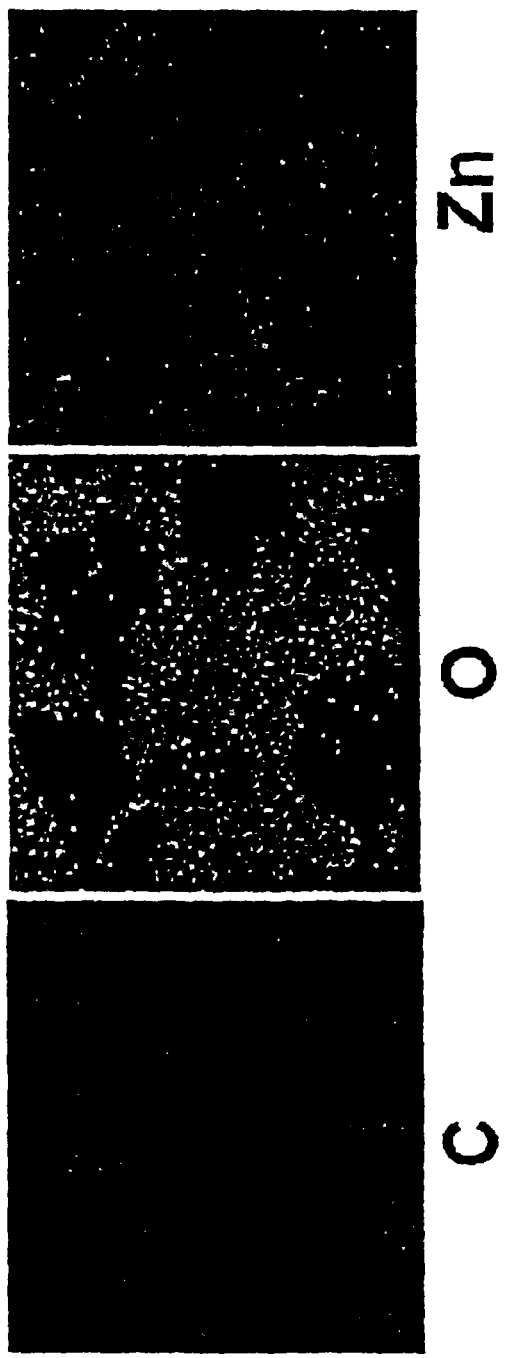

After introduction of ZnO alongside PPy and GO, the nanocomposite layer thickened on the framework, which consequently reduced the size of the pores as can be seen in FIG. 4(e). The space in between the lateral sheets widened, indicating the inclusion of ZnO as a third component shown in FIG. 4(f). The presence of Zn was verified by the elemental map, as shown in FIG. 4(g).

Figure 5:
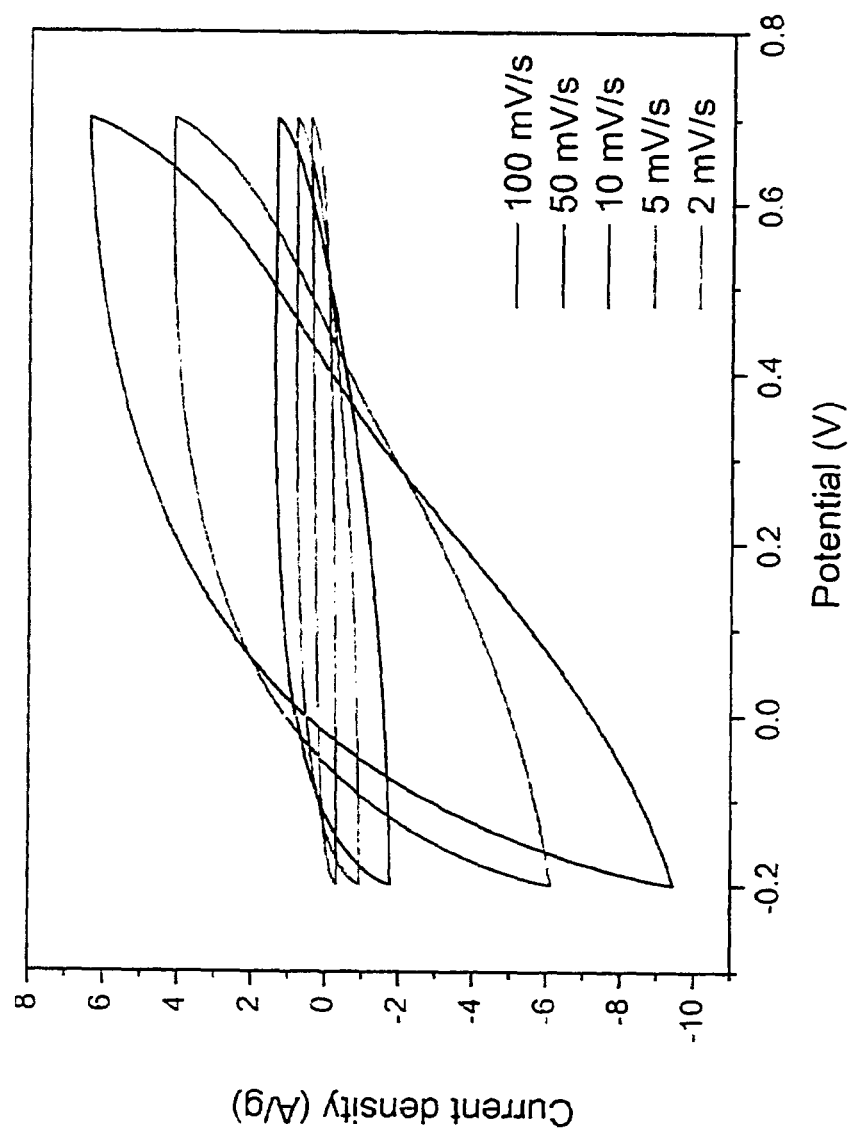
FIG. 5 is a graph depicting Cylic Voltammetry (CV) loops for PPy/GO/ZnO at various scan rates.
Figure 6C:
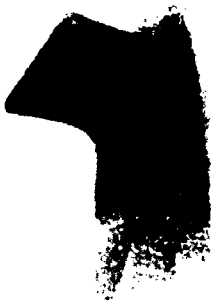
FIG. 6 (*a*) is a pictorial representation of the flexible supercapacitor at angle 0°.
FIG. 6(e) is a pictorial representation of the flexible supercapacitor bent at angle 180°.
Figure 6E:
Figure 6B:
Figure 6D:
Figure 6A:
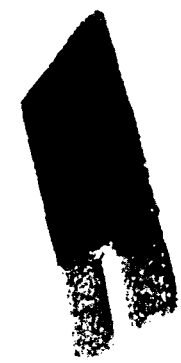

FIG. 5 shows CV loops of the PPy/GO/ZnO-based supercapacitor lack any obvious redox peaks at different scan rates in the range of 2-100 mV/s. At higher scan rates of 50 mV/s and 100 mV/s, the curves are pseudo-rectangular in shape, indicating a good capacitive behavior and rapid charging ability.

Figure 7A:
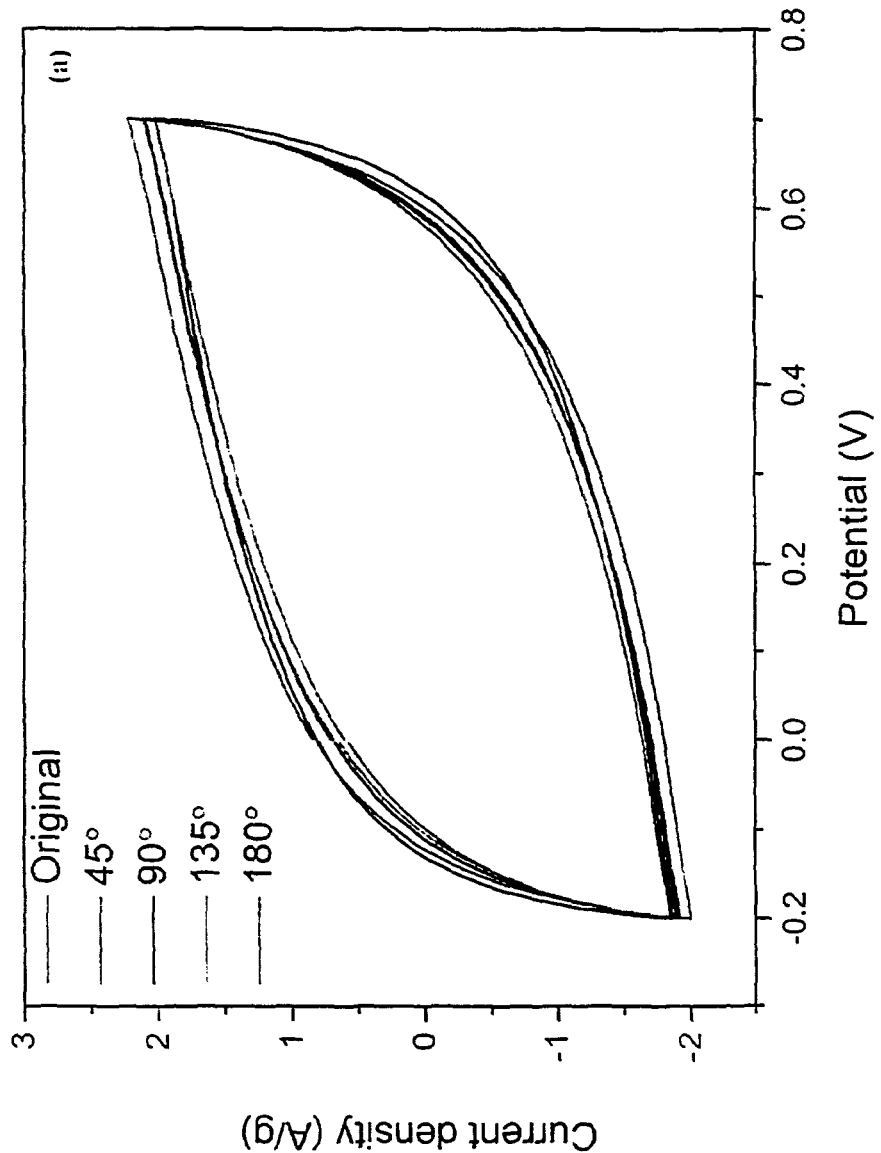
FIG. 7(a) is a graph depicting CV for PPy/GO/ZnO.
Figure 7B:
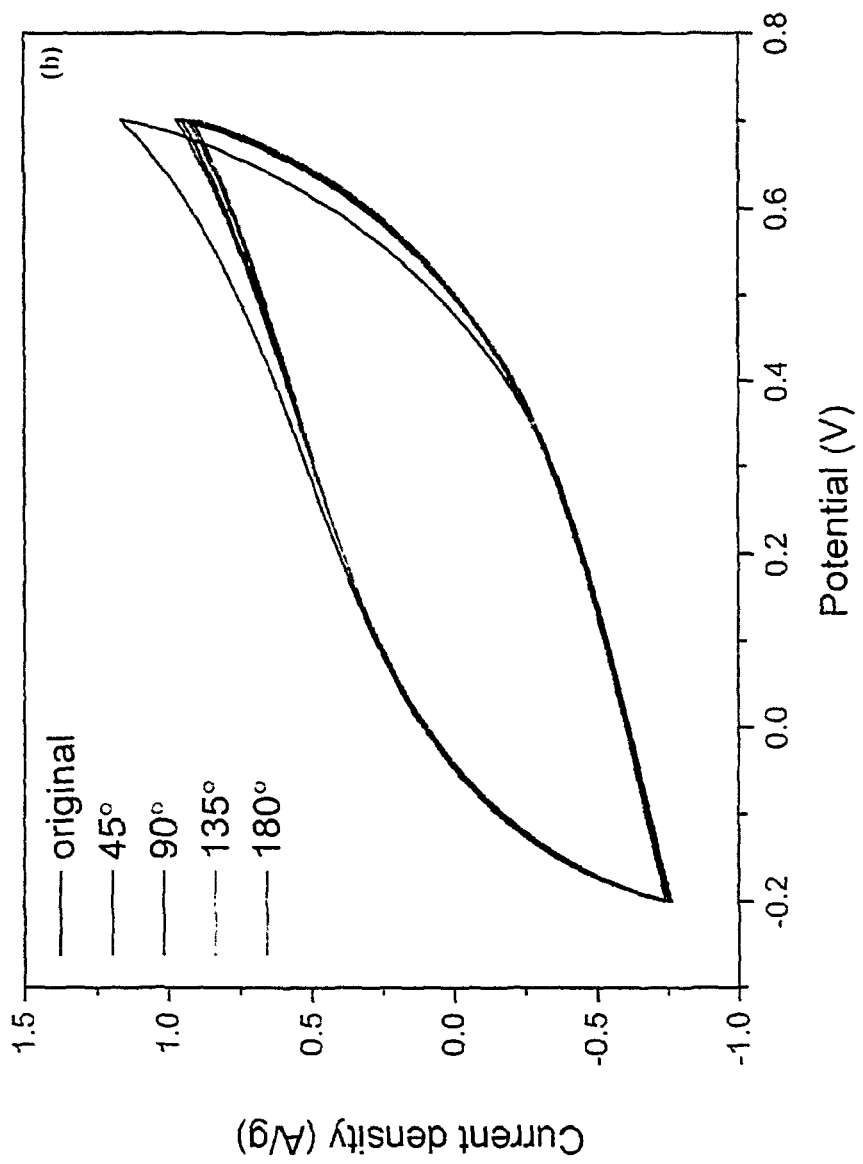
FIG. 7(b) is a graph depicting CV for activated carbon at 100 mV/s with various bending angles.
Figure 7C:
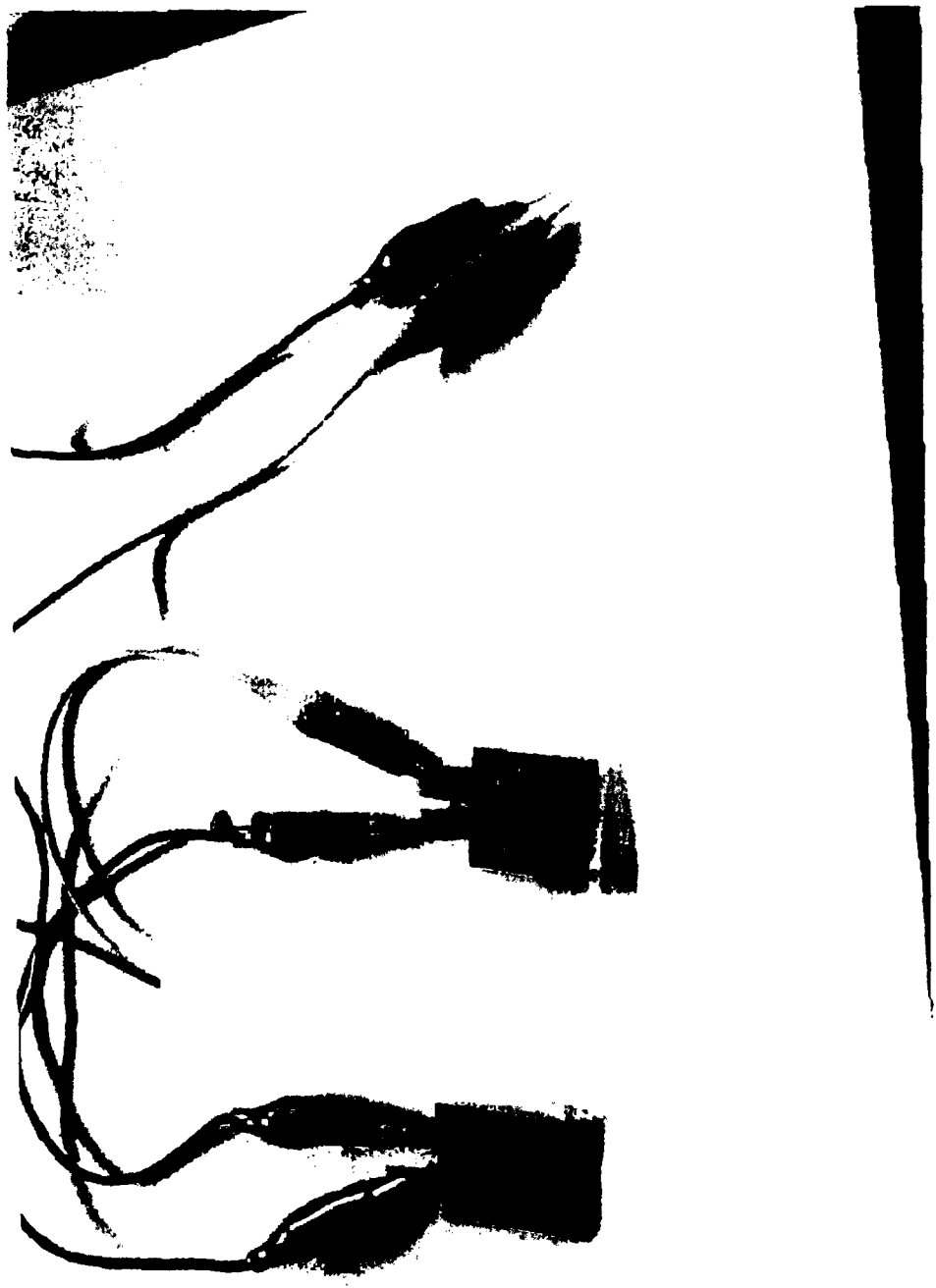
FIG. 7(c) is a pictorial representation of the flexible supercapacitor connected in series lighting up LED circuit.
Figure 7D:
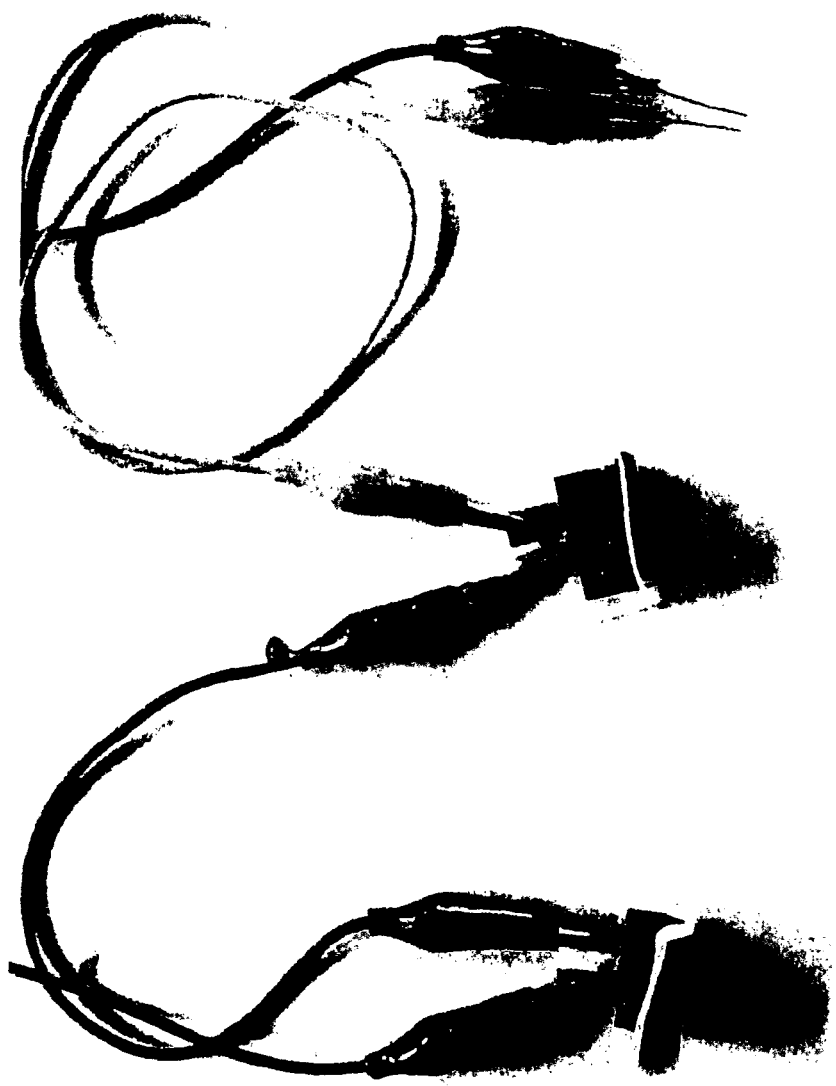
FIG. 7(d) is a pictorial representation of the flexible supercapacitor bent at 90° lighting up LED circuit.

To investigate the pliability of the as-fabricated supercapacitor, a hand-made device was bent at various angles as shown in FIG. 6. It was observed that the size and shape of the CV loops and their calculated specific capacitances (an average of 44.9 F/g at 100 mV/s) remained the same at all angles (FIG. 7a). This showed that the as-fabricated supercapacitor was able to withstand stress at different curvatures with no drastic changes in its electrochemical performance. When the ternary nanocomposite was replaced with activated carbon (AC) for comparison purposes, similar stable curves at the different angles were produced (FIG. 7b). On the downside, the AC-based supercapacitor recorded a much lower specific capacitance of 12.9 F/g on average at 100 mV/s. The prepared PPy/GO/ZnO supercapacitors connected in series were able to light up an LED circuit (FIG. 7c), and the performance was retained at a 90° bend (FIG. 7d), which proved the concept of a flexible energy storage device.

Figure 8:
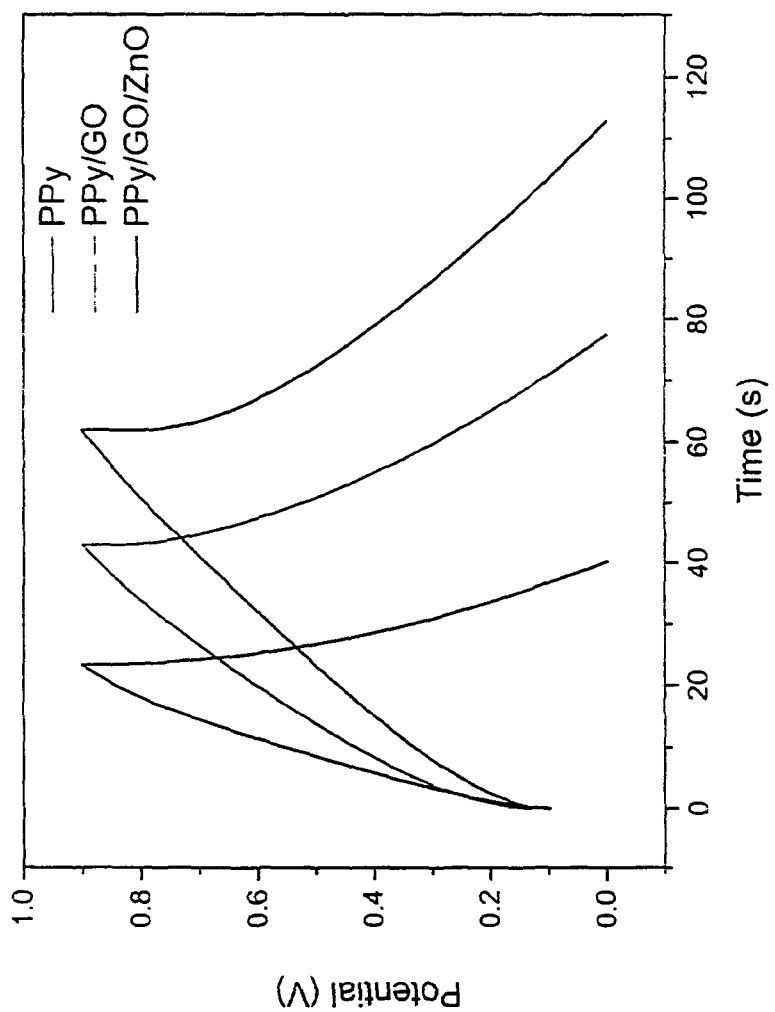
FIG. 8 is a graph depicting Galvanostatic charge/discharge cycles of PPy, PPy/GO, and PPy/GO/ZnO at current density of 1 A/g.

FIG. 8 shows that the discharge time for the PPy/GO/ZnO was the longest among all the samples, followed by PPy/GO and lastly PPy at a current density of 1 A/g. A longer discharge time implies better capacitance behavior.

Figure 9:
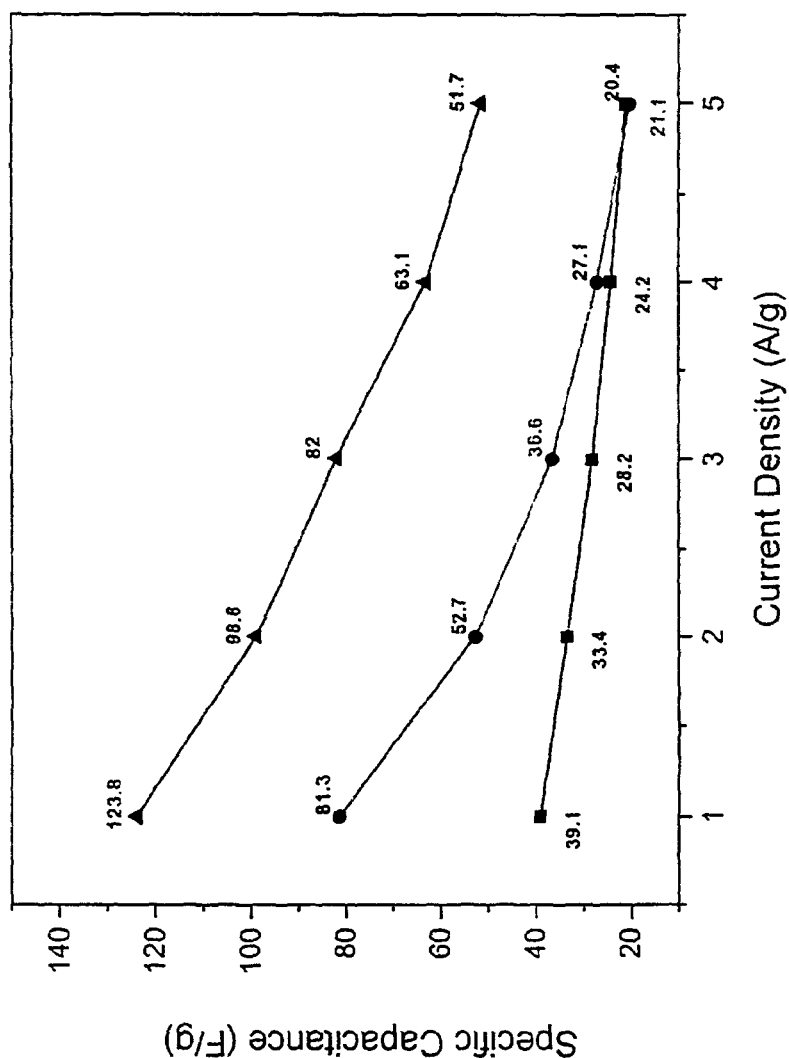
FIG. 9 is a graph depicting specific capacitances of PPy, PPy/GO, and PPy/GO/ZnO at various current densities.

The specific capacitance of the supercapacitor decreases with increasing current density, as illustrated in FIG. 9. This is due to an insufficient response time for the electrolyte ions to reach the active surface of the material at a high flow rate of current. PPy/GO/ZnO provided the best specific capacitance because of the presence of ZnO, which hindered the GO sheets from overlapping with one another during the robust charge/discharge process.

Figure 10:
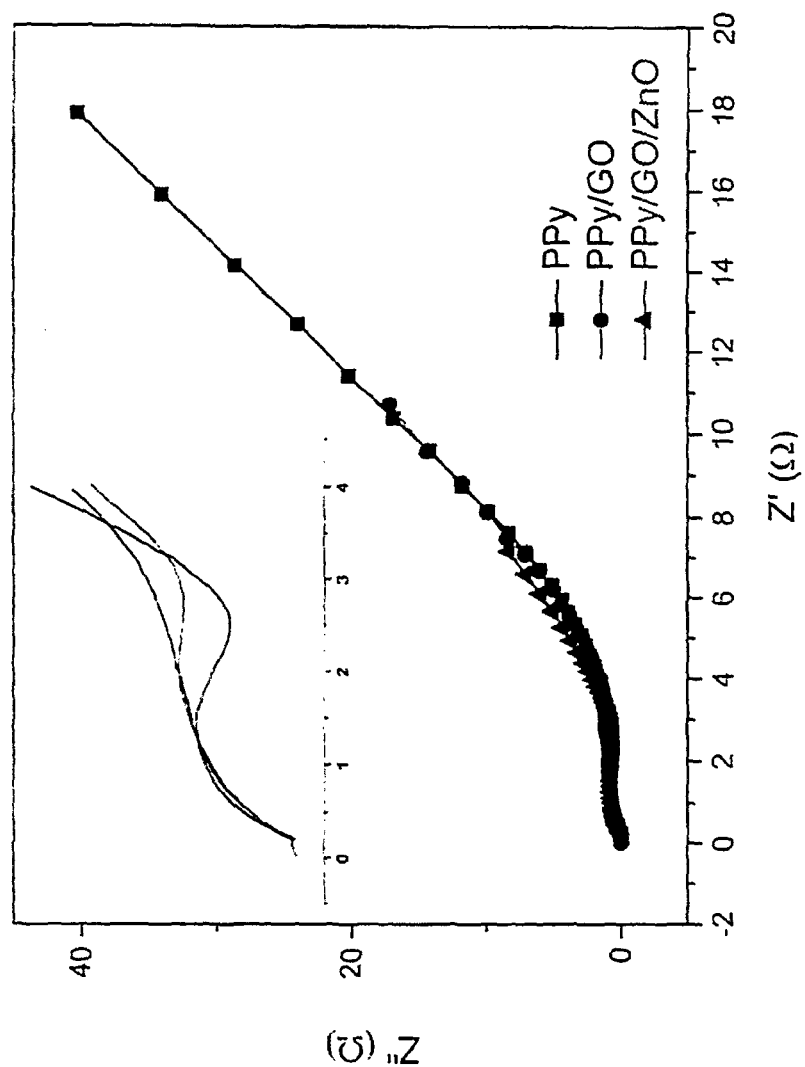
FIG. 10 is a graph depicting Nyquist plots of PPy, PPy/GO, and PPy/GO/ZnO.

From the Nyquist plots in FIG. 10, it has been shown that all of the fabricated supercapacitors displayed two important features: the equivalent series resistance (ESR) and the charge transfer resistance ($R_{ct}$) at the electrode and electrolyte interface. The ESR was the first intercept of the semicircle formed at the lower part of the plot that corresponded to the high frequency region, which was correlated to the charge transfer limiting process and attributed to double-layer capacitance ($C_{dl}$). The charge transfer resistance ($R_{ct}$) at the interface between the electrode and electrolyte was in parallel with $C_{dl}$, which could be directly acquired from the diameter of the semicircle. The ESR values for pure PPy, PPy/GO, and PPy/GO/ZnO were 0.17Ω, 0.14Ω and 0.18Ω, respectively. The PPy/GO electrode recorded the lowest ESR as a result of the graphene network structure facilitating efficient excess electrolyte ions within the graphene surface, thus shortening the ion diffusion pathway. The presence of ZnO in the nanocomposite caused the supercapacitor to exhibit the highest ESR, implying that the electrode material was more resistive. This was due to the poor electrical conductivity of the metal oxide. Meanwhile, PPy recorded the lowest $R_{ct}$ at 0.83Ω), followed by PPy/GO/ZnO at 0.94Ω and PPy/GO at 1.07Ω. PPy/GO/ZnO exhibited a smaller $R_{ct}$ value than that of PPy/GO, indicating that the incorporation of ZnO improved the charge transfer performance. This was attributed to the semi-conducting nature of ZnO, which improved the compactness and coupling through the PPy/GO/ZnO grain boundaries to facilitate the charge motion. $R_{ct}$ was related to the faradaic exchange of electrolyte $K^+$ ions, at which the PPy fully employed the redox mechanisms, whereas the introduction of graphene oxide tuned the charge/discharge mechanism toward an EDLC characteristic.

Figure 11:
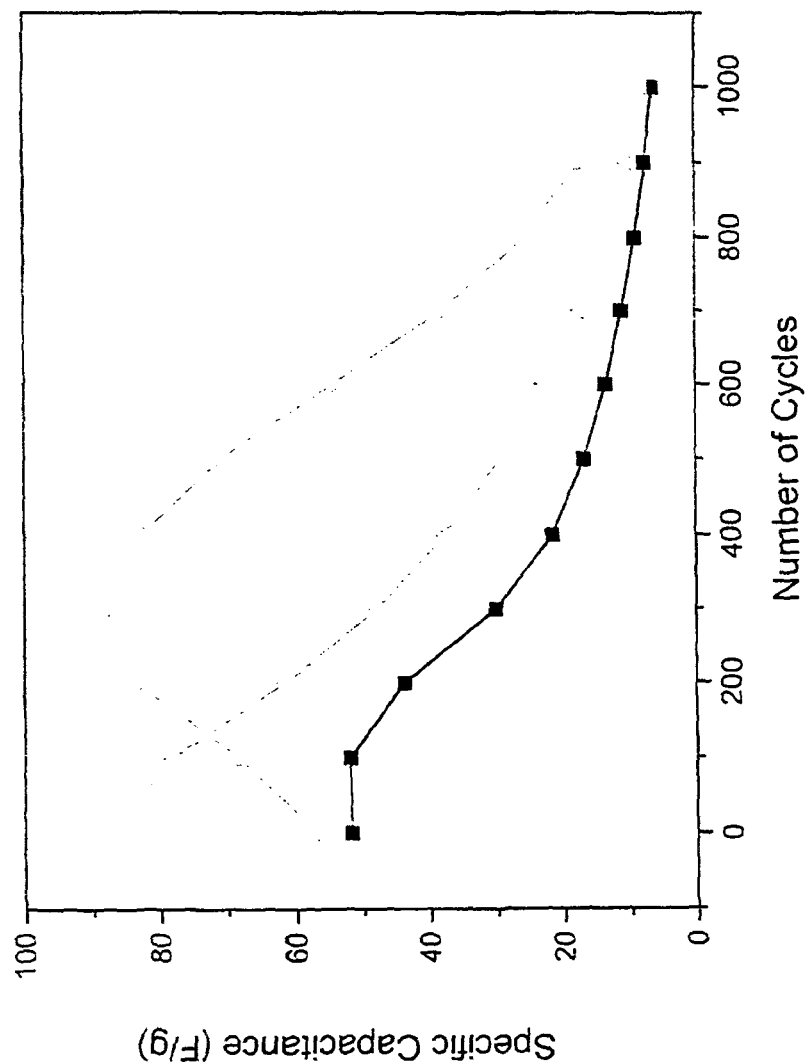
FIG. 11 is a graph depicting specific capacitive retention values of PPy, PPy/GO, and PPy/GO/ZnO electrodes at 1000 galvanostatic charge/discharge cycles at current density of 1 A/g.
Figure 12:
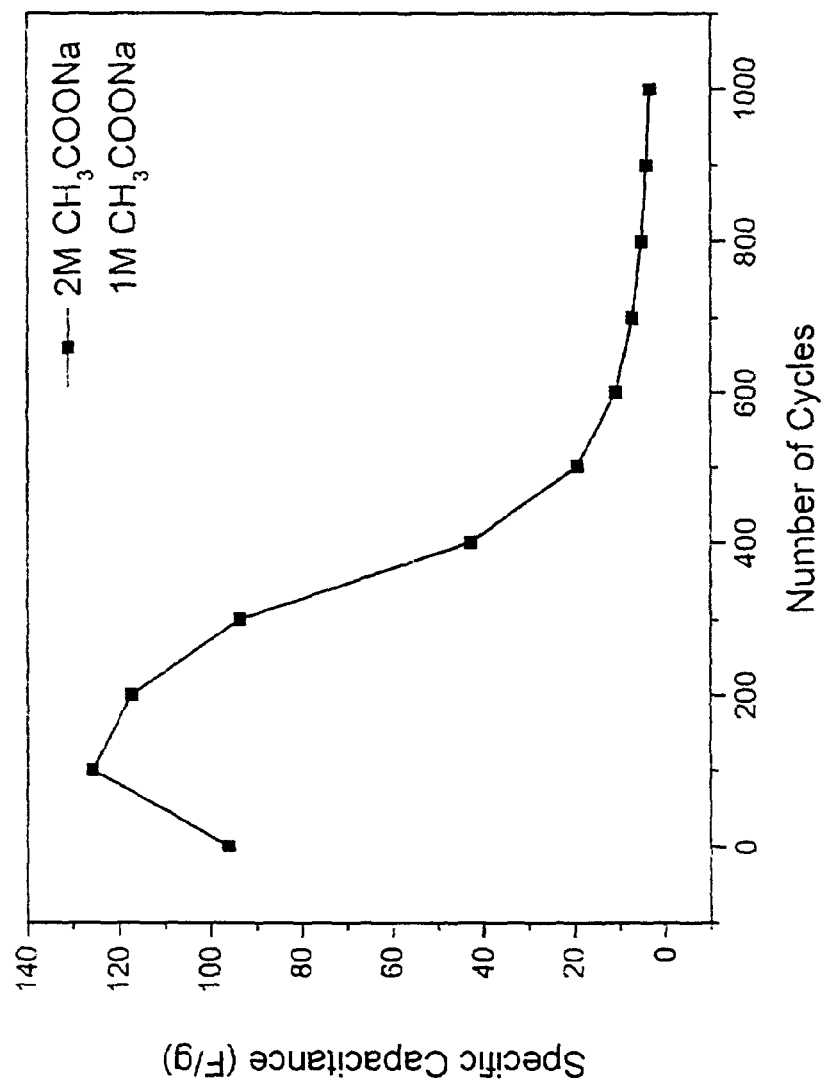
FIG. 12 is a graph depicting specific capacitive retention values of PPy/GO/ZnO electrodes with different concentrations of sodium acetate at 1000 galvanostatic charge/discharge cycles at current density of 1 Ng.

The cyclic stabilities of the PPy, PPy/GO, and PPy/GO/ZnO supercapacitors were subjected to continuous galvanostatic charge/discharge cycles (FIG. 11). It can be seen that the capacitance of the PPy/GO/ZnO supercapacitor remained at 70.5% at the 200th cycle, before a continuous decrease for 1000 cycles. This may have been due to the chemical reactions between the KOH electrolyte and the ZnO that converted ZnO to $Zn(OH)_2$ in an alkaline condition. The PPy supercapacitor had a similar declining trend as a ternary supercapacitor. The capacitance of the PPy/GO supercapacitor increased dramatically up to the 300th cycle due to the efficient infuse and out-fuse electrolyte ions facilitated by GO. Then, there was a sharp decrease at the 1000th cycle. The rapid deterioration of the capacitive performance of the electrode was mainly due to the mechanical and electrical faults in the polymer chains as a result of the continuous charging/discharging, which caused volume contraction/expansion in the electrode materials. In addition, the cycle stability of the PPy/GO/ZnO supercapacitor was also tested using a $CH_3COONa$ electrolyte at different concentrations (FIG. 12). At a higher concentration (2M) of the $CH_3COONa$ electrolyte, the specific capacitance remained at 97.4% after 300 cycles, before a continuous decrease to 1000 cycles. Interestingly, at a 1 M concentration of the electrolyte, 92.7% of the capacitance performance was retained, even after 1000 cycles. These results show that the fabricated supercapacitor was sensitive to the nature of the electrolyte.

The above-mentioned novel flexible supercapacitor eliminates the problems and shortcoming of the existing flexible supercapacitor and provides number of advantages over them. The flexible supercapacitor of present invention demonstrates an excellent pliability by showing no effect on the capacitance upon bending at various angles. Also, the fabricated supercapacitor of instant invention is capable of lighting up a Light Emitting Diode (LED) circuit even after bending, strengthening the concept of a flexible storage device. The potential of the as-fabricated supercapacitor for real applications was manifested by its ability to light up a LED after being charged.

In addition to the superior performance, the disclosed flexible supercapacitor can be fabricated in a single step by synthesis of an electrode material onto a conductive substrate. Further, the cycling stability of the supercapacitor shows favorable specific capacitance retention of more than 90% after 1000 cycles for mild alkaline electrolytes compared to strong alkalic electrolytes. Thereby, enhances the energy storage capability.

The exemplary implementation described above is illustrated with specific shapes, dimensions, and other characteristics, but the scope of the invention includes various other shapes, dimensions, and characteristics. Also, the flexible capacitor as described above could be fabricated in various other ways and could include various other materials, including various other metal oxides, electrodes, salts etc.

Similarly, the exemplary implementations described above include specific examples of metal oxides, electrodes, metals salts etc., but a wide variety of other such steps of fabrication could be used within the scope of the invention, including additional steps, omission of some steps, or performing process in a different order.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be provided broadest scope of consistent with the principles and the novel and inventive features disclosed or suggested herein. Accordingly, the invention is anticipated to hold on to all other such alternatives, modifications, and variations that fall within the spirit and scope of the present invention and appended claims.

The invention claimed is:

1. A flexible supercapacitor comprising an electrolyte sandwiched between nickel foams electrodeposited with a nanocomposite
   wherein said nanocomposite comprises of a conducting polymer, graphene oxide and a metal oxide.

2. The flexible supercapacitor as claimed in claim 1, wherein said conducting polymer is selected from a group consisting of polypyrrole, polyaniline, polythiophene, polystyrene sulfonate.

3. The flexible supercapacitor as claimed in claim 1, wherein said metal oxide is selected from a group consisting of zinc oxide, manganese oxide, cobalt oxide, copper oxide, nickel oxide, iron oxide; mixed oxides such as nickel cobaltite and zinc ferrite.

4. The flexible supercapacitor as claimed in claim 1, wherein said nanocomposite is doped with dopants selected from a group consisting of sodium toluenesulfonate, sulfuric acid, ammonium persulfate, meta-chloroperoxybenzoic acid, hydrochloric acid, phosphoric acid and iron chloride.

5. The flexible supercapacitor as claimed in claim 1, wherein said electrolyte is selected from a group consisting of polyvinylacetate/KOH hydrogel polymers based on polymers selected from group consisting of polyvinylacetate, polypropylene oxide and polyethylene oxide.

6. A process for preparation of a flexible supercapacitor, the process comprising:
    electrodepositing a nanocomposite electro-potentiostatically on a nickel foam from an aqueous solution having a conducting monomer, a graphene oxide and a metal salt, placed in one compartment cell;
    compressing an electrolyte between at least two layers of electrodeposited nickel foams.

7. The process as claimed in claim 6, wherein said electrodepositing is carried out at a constant potential selected from 0.2 V to 2.0 V, at 20° C. to 40° C., for 1 to 180 minutes.

8. The process as claimed in claim 7, wherein said electrodepositing is carried out at a constant potential +0.8V (versus SCE) at 30° C. for 15 minutes.

9. The process as claimed in claim 6, wherein said conducting monomer is polymerized to form its corresponding conducting polymer.

10. The process as claimed in claim 6, wherein said compartment cell having nickel foam as a working electrode.

11. The process as claimed in claim 6, wherein said compartment cell having platinum rod as a counter electrode.

12. The process as claimed in claim 6, wherein said compartment cell having saturated calomel electrode (SCE) as a reference electrode.

13. The process as claimed in claim 6, wherein said aqueous solution having 0.1 µM to 10 M of conducting monomer.

14. The process as claimed in claim 6, wherein said aqueous solution having 0.1 µM to 10 M of metal salt.

15. The process as claimed in claim 6, wherein said aqueous solution having 0.1 µM to 10 M graphene oxide.

16. The process as claimed in claim 9, wherein said conducting polymer is selected from a group consisting of polypyrrole, polyaniline, polythiophene, polystyrene sulfonate.

17. The process as claimed in claim 6, wherein said aqueous solution comprises of a dopant selected from a group comprising of sodium toluenesulfonate, sulfuric acid, ammonium persulfate, meta-chloroperoxybenzoic acid, hydrochloric acid, phosphoric acid and iron chloride.

18. The process as claimed in claim 6, wherein said metal salt converts into a corresponding metal oxide during said electrodeposition.

19. The process as claimed in claim 18, wherein said metal salt is selected from metal complexes such as chlorides, acetates and sulphates.

* * * * *